(12) United States Patent
Gerding et al.

(10) Patent No.: US 8,011,241 B2
(45) Date of Patent: Sep. 6, 2011

(54) LEVEL METER

(75) Inventors: Michael Gerding, Herne (DE); Thomas Musch, Mulheim/Ruhr (DE); Stephan Neuburger, Stadecken-Elsheim (DE)

(73) Assignee: Krohne Messtechnik GmbH & Co. KG (DE)

( * ) Notice: Subject to any disclaimer, the term of this patent is extended or adjusted under 35 U.S.C. 154(b) by 370 days.

(21) Appl. No.: 12/041,319

(22) Filed: Mar. 3, 2008

(65) Prior Publication Data

US 2008/0210004 A1   Sep. 4, 2008

(30) Foreign Application Priority Data

Mar. 2, 2007   (DE) .......................... 10 2007 010 627

(51) Int. Cl.
 *G01N 23/00* (2006.01)
(52) U.S. Cl. .................................................. 73/290 V
(58) Field of Classification Search ................ 73/304 C, 73/290 V, 290 R
See application file for complete search history.

(56) References Cited

U.S. PATENT DOCUMENTS

| | | | | |
|---|---|---|---|---|
| 4,228,530 A * | 10/1980 | Bergey | ........................... | 367/112 |
| 5,910,188 A | 6/1999 | Resnick | | |
| 6,681,626 B2 * | 1/2004 | Funfgeld | ..................... | 73/290 V |
| 6,691,570 B1 | 2/2004 | Neuhaus et al. | | |
| 6,925,869 B2 * | 8/2005 | Senibi et al. | ................. | 73/290 V |
| 6,943,566 B2 | 9/2005 | Florin et al. | | |

FOREIGN PATENT DOCUMENTS

WO   WO 00/43739   7/2000

* cited by examiner

*Primary Examiner* — Hezron E Williams
*Assistant Examiner* — Rodney T Frank
(74) *Attorney, Agent, or Firm* — Cesari and McKenna, LLP; John F. McKenna

(57) ABSTRACT

A level meter employs the radar concept for measuring the fill level of a medium in a container and incorporates an electric conductor system for conducting an electromagnetic signal into the container and returning reflected components of the electromagnetic signal from the container. Here, the electric conductor assembly is integrated into a wall of the container. The result is a universally employable electric conductor assembly so configured as to be unobstructed by built-in structures in the container such as agitators, intake pipe fittings or discharge connectors.

4 Claims, 1 Drawing Sheet

LEVEL METER

BACKGROUND OF THE INVENTION

The invention relates to a level meter that employs the radar concept for measuring the fill level of a medium in a container and incorporates an electric conductor system for conducting an electromagnetic signal into the container and returning reflected components of the electromagnetic signal from the container.

FIELD OF THE INVENTION

The measuring process in a level meter that employs radar technology and features an electric conductor system for conducting an electromagnetic signal into and back from a container is based on the time domain reflectometry (TDR) principle that has been used for instance in cable testing and resembles the mode of operation of conventional radars. For example, a TDR level meter of that type transmits an extremely short electric pulse via an essentially straight electric conductor into a container holding a medium such as a liquid, powder, or granular substance whose fill level is to be determined. The electric conductor system is typically designed as a single or dual conductor that extends into the medium. If the electric conductor system is composed of dual conductors, these may be in the form for instance of two parallel lines or of a coaxial cable.

In the case of a dual-conductor configuration, an electric pulse fed into it practically travels "between" the two conductors into the container, where it is at least partially reflected off the surface of the medium, and the reflected component of the short electric pulse is typically received by a processing electronics unit that measures the signal runtime and thus the level of the medium in the container. The reflected component of the short electric pulse varies as a function of the dielectric constant of the medium and increases as that constant increases. The signal runtime is proportional to the level of the medium in the container. Varying environmental conditions, such as increasing or decreasing ambient temperatures do not negatively affect the measuring accuracy of the TDR level meter. Moreover, the runtime of the signal is unaffected by the dielectric constant of the medium whose level is to be measured.

THE PRIOR ART

The electric conductor assembly employed in conventional level meters is typically in the form of a rod or cable attached, for instance, to a container-mounted flange and thus suspended into the container. When configured in that form the electric conductor assembly may essentially be centered in the container or it may be positioned more to the side of the container. In all cases, however, there may be a space contention problem between the electric conductor assembly and built-in structures in the container, such as agitators, intake pipe fittings or discharge connectors.

SUMMARY OF THE INVENTION

It is the objective of this invention to introduce a level meter design incorporating a universally employable electric conductor assembly for conducting the electromagnetic signal.

For a level meter of the type described above, this objective is achieved by integrating the electric conductor assembly in the container wall.

Thus, according to the invention, the novel level meter design includes a container "pre-equipped" with its own electric conductor assembly for conducting the electromagnetic signal. It follows that the invention eliminates the need for the separate installation of an electric conductor assembly.

The electric conductor assembly could essentially be attached to the inside wall surface of the container. In a preferred embodiment of the invention, however, the electric conductor assembly is accommodated within the container wall. The container can thus be shaped in a way where the outer contour of its wall does not differ from that of a conventional design.

It is, of course, possible to connect the electric conductor assembly to the medium in electrically conductive fashion. However, in a preferred embodiment of the invention, the electric conductor assembly is electrically insulated from the medium. This makes it possible to protect the electric conductor assembly from chemically aggressive substances and in general to prevent any chemical interaction between the material of the electric conductor assembly and the medium being measured.

While it is entirely possible to install separate electrical insulation, in a preferred embodiment of the invention, the electrical insulation is a constituent component of the container wall. Most desirably, the container wall is a metal wall provided with an internal layer of an electrically insulating material, and the electric conductor assembly is integrated into that internal insulating layer. Again in a preferred embodiment, the internal insulating layer is made of enamel so that it is possible to provide the electric conductor assembly in the form of conductors integrated in the wall of enameled metal containers.

As an alternative, another preferred embodiment of the invention features a container wall which consists of a synthetic resin at least in the area of the electric conductor assembly but preferably in its entirety. In that case, one conductor of the conductor assembly can be embedded in the wall of plain synthetic-material and of metal-coated synthetic-material containers.

As stated further above, the container wall may essentially be configured like the wall of conventional containers. In a preferred embodiment of the invention, however, one of the conductors of the electric conductor assembly is provided in either a projecting or a recessed section of the container wall. This allows for various different designs producing variations of the field distribution of the electromagnetic signal.

The following description will explain the invention in detail, with reference to the attached drawings.

DESCRIPTION OF A PREFERRED EMBODIMENT

Figure 1:
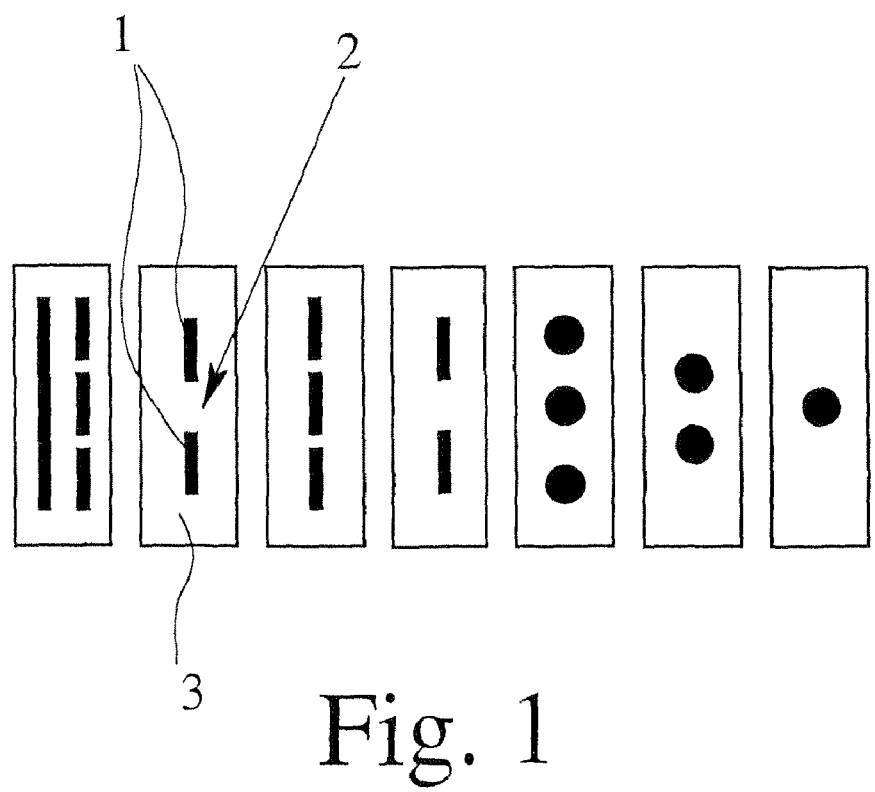
FIG. 1 shows cross sections of different conductor layouts for conductor assemblies in level meters according to preferred embodiments of the invention, the container wall thickness being the same in all cases.

FIG. 1 shows several cross-sectional representations, each along a plane that extends parallel to the bottom of the container, of a wall 3 section accommodating at least one conductor 1 of an electric conductor assembly 2 designed to carry an electromagnetic signal. As can be seen in FIG. 1, the electric conductor 1 may be shaped in many different ways, whether as a flat ribbon, for example, or a rod, while at the same time the positioning of the conductors 1 relative to one another may be implemented along many different variations.

Figure 2:
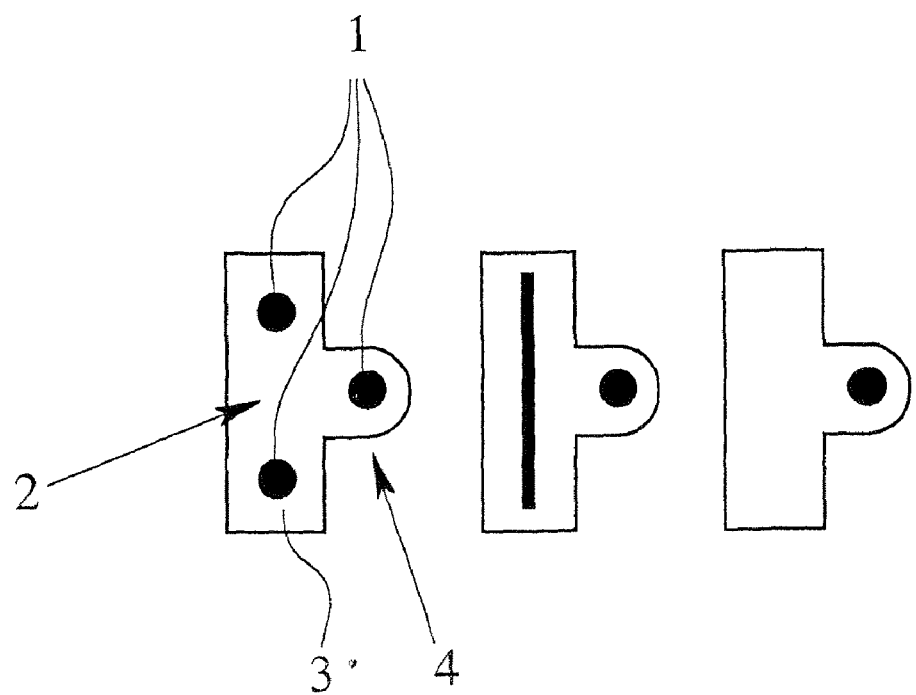
FIG. 2 shows cross sections of different conductor layouts for conductor assemblies in level meters according to preferred embodiments of the invention, with one conductor of the electric conductor assembly embedded in a projection of the wall.

FIG. 2, in turn, shows that conductors 1 of different physical shapes, for instance ribbon and rod conductors, may be combined. Of course, single conductors as shown on the far right in FIG. 1 are equally possible.

The wall 3 in the illustrated embodiments consists of a synthetic material in which metal conductors 1 are integrated. In the examples in FIG. 2, the section of the wall 3 containing the conductor assembly 2 is not evenly thick, but features a projection 4. Embedded in that projection 4 is one conductor 1 of the respective conductor assembly 2. The projection 4 extends over the entire length of the conductor 1 embedded in it. This permits the attainment of a maximum distribution of the field induced in the medium by the electromagnetic signal via the conductors 1, and thus of a correspondingly good signal-to-noise ratio.

The invention claimed is:

1. A level meter employing the radar principle for measuring the fill level of a medium in a container including a metal wall and incorporating an electric conductor assembly for conducting an electromagnetic signal into the container and returning reflected components of the electromagnetic signal from the container and an electrical insulation between the electric conductor assembly and the medium, wherein the electric conductor assembly is integrated into said metal wall of the container, and the metal wall is internally lined with an electrically insulating layer constituting said electrical insulation.

2. The level meter as in claim 1, wherein the electric conductor assembly is embedded in the wall of the container.

3. The level meter as in claim 1, wherein the electrically insulating layer is of enamel.

4. The level meter as in claim 1, wherein one conductor of the electric conductor assembly is integrated in a particular region of the container wall in which region the wall features a projection or a recess.

* * * * *